(12) United States Patent
Sheridan

(10) Patent No.: US 8,568,497 B2
(45) Date of Patent: Oct. 29, 2013

(54) AGGREGATE ABRASIVE GRAINS FOR ABRADING OR CUTTING TOOLS PRODUCTION

(76) Inventor: Cedric Sheridan, Dondelange (LU)

( * ) Notice: Subject to any disclaimer, the term of this patent is extended or adjusted under 35 U.S.C. 154(b) by 321 days.

(21) Appl. No.: 12/934,442

(22) PCT Filed: Mar. 26, 2009

(86) PCT No.: PCT/EP2009/053597
§ 371 (c)(1),
(2), (4) Date: Sep. 24, 2010

(87) PCT Pub. No.: WO2009/188381
PCT Pub. Date: Oct. 1, 2009

(65) Prior Publication Data
US 2011/0056142 A1    Mar. 10, 2011

(30) Foreign Application Priority Data
Mar. 28, 2008  (EP) .................................. 08153608

(51) Int. Cl.
*B24D 99/00* (2010.01)
*C23C 16/27* (2006.01)
(52) U.S. Cl.
USPC ...................................... 51/293; 427/249.13
(58) Field of Classification Search
USPC ......... 51/293, 307; 427/249.8, 249.13, 248.1, 427/215
See application file for complete search history.

(56) References Cited

U.S. PATENT DOCUMENTS

| 2,947,608 | A | 8/1960 | Hall |
| 3,779,726 | A | 12/1973 | Fisk |
| 4,770,907 | A * | 9/1988 | Kimura ........................ 427/217 |
| 2005/0019114 | A1 | 1/2005 | Sung |
| 2008/0017421 | A1 | 1/2008 | Lockwood |

FOREIGN PATENT DOCUMENTS

| EP | 0754106 B1 | 1/1997 |
| WO | 9916729 A1 | 4/1999 |
| WO | 2008025836 A1 | 3/2008 |
| WO | 2008025838 A1 | 3/2008 |

OTHER PUBLICATIONS

International Search Report PCT/EP2009/053597; Dated Nov. 19, 2009.

* cited by examiner

*Primary Examiner* — Pegah Parvini
(74) *Attorney, Agent, or Firm* — Cantor Colburn LLP

(57) ABSTRACT

A method of forming aggregate abrasive grains for use in the production of abrading or cutting tools comprises providing abrasive core particles; coating these particles with adhesive, the adhesive comprising a binding agent and a solvent for the binding agent; separately dropping the adhesive-coated core particles onto a layer of abrasive peripheral particles and covering the dropped core particles with further peripheral particles, in such a way as to form aggregate particles, each of which comprises a core particle having peripheral particles attached to it; consolidating the aggregate particles by causing the solvent to evaporate, i.e. by letting the adhesive set.

18 Claims, 4 Drawing Sheets

AGGREGATE ABRASIVE GRAINS FOR ABRADING OR CUTTING TOOLS PRODUCTION

TECHNICAL FIELD

The present invention generally relates to a method of formation an aggregate abrasive grain for use in the production of abrading or cutting tools. In the following, "aggregate abrasive grain" or "aggregate grain" designates an abrasive or superabrasive particle ("core particle"), which further abrasive or superabrasive particles ("peripheral particles") are attached to by chemical bonds or mechanically. Such aggregate grains are useful, in particular, for facilitating the production of abrading or cutting tools, e.g. drill bits, inserts or cutting elements for drill bits, etc. as well as for improving the quality of such tools.

BACKGROUND

Tools for cutting and/or abrading are conventionally fabricated of a suitable matrix material with minute abrasive grains, such as diamonds, embedded within the matrix material. Basically, such tools are formed by conventional powder metallurgical techniques, wherein the abrasive grains are initially mixed with the matrix material (e.g. metals, alloys, metal carbides etc., as well as mixtures thereof) in powder form and some binding agent, after which the mixture press-moulded to bond and shape the mixture into the desired tool. In the so-called hot-pressing method, the mixture is placed in a mould having the shape of the abrasive tool to be formed and pressed at high pressure and temperature to cause sintering of the sinterable material. According to the "cold press and sinter" technique, the mixture is first pressed at high pressure into the desired tool shape and thereafter fired at high temperature in a furnace to sinter the tool. As an alternative to these compaction techniques, it is known, for instance from document EP 0 754 106 B1, to provide soft and easily deformable preforms in the form of a slurry or paste containing the matrix material in powder form, abrasive grains and some liquid binder phase. The soft and easily deformable preforms are subsequently sintered and/or infiltrated. Tools fabricated in these or similar manners are commonly referred to as metal-bonded abrading or cutting tools.

Efficiency and lifetime of an abrading or cutting tool are among others determined by the degree of uniformity of the distribution of the abrasive grains on the surface or volume of the tool and by the retention strength of the abrasive grains within the surrounding matrix material. In tools fabricated according to any of the above-described techniques, the abrasive grains are randomly distributed, which means that some of them may be close to each other, possibly touching each other, while some regions of the tool may only have little density of abrasive grains. As a matter of fact, this negatively affects the cutting or abrading performance of the tool.

An important step towards uniform distribution of abrasive particles throughout the matrix material was the method taught in U.S. Pat. No. 3,779,726. This document proposes to tumble the abrasive grains in the presence of a powder of sinterable material and binding agent while controlled amounts of water are simultaneously sprayed thereon. In this way, each abrasive particle is singularly coated with a sinterable particulate mass in such a way that granules, so-called "pellets", are formed. These pellets are subsequently pressed into the desired shape at high pressure (35 tons per square inch, i.e. approximately 500 MPa), possibly after being mixed with granulated metal powder. Those skilled in the art are aware that mixing the pellets with metal powder may cause the problem of segregation between the metal powder and the pellets. Another method for individually coating abrasive grains is disclosed in U.S. Pat. No. 4,770,907. This method commences with the preparation of a slurry of a selected metal powder with a binding agent dissolved in an organic solvent in predetermined relative concentrations. The abrasive grain cores are then fluidized in a work vessel and the slurry is sprayed onto the abrasive grains cores during fluidization, whereby a generally uniform coating of the slurry builds and dries on each abrasive grain. A further improvement in terms of particle distribution has been reached with the method of WO 2008/025838 A1, according to which a soft, easily deformable paste is formed which has superabrasive particles dispersed therein, each of these particles being individually encrusted within a coating of presintered material. The presintered coating keeps the superabrasive particles at least at a distance of twice the thickness of the coatings from one another. These coatings also prevent a direct contact between the superabrasives and the mould or the walls of an extrusion/injection moulding system.

US patent application 2008/0017421 A1 discloses encapsulated particles, whose encapsulation ("shell") comprises sinterable matrix material and abrasive particles. The composition of the matrix as well as type, size and density of the abrasive particles in the shell can be selected depending on the specifications for the abrading or cutting tool. To produce individually encapsulated particles having similar amounts of shell material and approximately the same size, US 2008/0017421 A1 suggests mixing the particles to be encapsulated, matrix powder and the abrasive particles for the shell in a conventional mixing machine and processing the resulting mix with a granulator, in which the mix is extruded into short "sausage" shapes, which are then rolled into balls (granules) and dried. As an alternative, the document proposes the using the so-called Fuji-Paudal pelletizing machine, disclosed e.g. in U.S. Pat. No. 4,770,907. As regards the "sausage" method, the granules that are formed are not uniform so that a step of selecting granules of substantially the same size is requires. This method has the further drawbacks that each granule formed does not necessarily contain one (and only one) core particle and that the core particle is not necessarily positioned centrally within its shell. Thus 2008/0017421 A1 does not enable the production of pellets having a single abrasive particle in the centre.

Neither U.S. Pat. No. 4,770,907 nor U.S. Pat. No. 3,779,726 disclose methods allowing coating core particles with shell particles whose size approaches the size of the core particles: the ratio of the average diameter of the shell particles to the average diameter of the core particles should not exceed 1/7. Nevertheless, one already encounters serious problems with the above methods as the ratio exceeds 1/11. Another problem arises if the abrasive particles to be coated and the particles used as the surrounding material exhibit very different densities (e.g. diamond: 3.5 $g/cm^3$, coarse WC: 15.8 $g/cm^3$, fused WC: 16.4 $g/cm^3$) because the particles tend to segregate. The difficulties caused by density differences are particularly pronounced in the Fuji-Paudal method. The quality of the results achieved furthermore depends on the shape of the particles involved.

BRIEF SUMMARY

The invention provides aggregate abrasive grains, wherein the diameter of the peripheral particles can be closer to the diameter of the core particles.

It should be noted that whenever reference is made herein to size or diameter of particles, this shall be understood as "average size" or "average diameter", determined e.g. by sieving. As is common practice in the field of abrasive particles, we will indicate particle size or diameter as a range of mesh sizes (using ASTM standard), e.g. −20/+30 mesh (which corresponds to particles diameters from about 600 to about 850 µm). It shall also be noted that the use of the term diameter is not meant to imply any specific particle shape (unless otherwise specified).

According to a first aspect of the present invention a method of forming aggregate abrasive grains for use in the production of abrading or cutting tools is proposed, which comprises the following steps:

providing the abrasive particles intended as the core particles of the aggregate abrasive grains (these particles will hereinafter be referred to as core particles for simplicity), coating these particles with adhesive, the adhesive comprising a binding agent and a solvent for the binding agent;

separately dropping the adhesive-coated core particles onto a layer of abrasive particles intended as the peripheral particles (these particles will hereinafter be referred to as peripheral particles for simplicity) and covering the dropped core particles with further such particles, in such a way as to form aggregate particles, each of which comprises a core particle having peripheral particles attached to it;

consolidating the aggregate particles by causing the solvent to evaporate, i.e. by letting the adhesive set.

Those skilled will appreciate that the present method does not require, for the attachment of the peripheral particles, a mixing or fluidizing step, during which the aggregate particles would be subjected to relatively strong mechanical forces eventually causing the disintegration of the aggregate particles before the adhesive has become sufficiently dry. In contrast, it is preferable to take care that the aggregate particles are handled as gently as possible as long as they have not been consolidated. This can be done, for instance, by simply dropping the adhesive-coated core particles into the powder with the peripheral particles, then dropping further peripheral particles onto the core particles and then heating the entire charge to make the solvent evaporate, while avoiding as much as possible, during these steps, any shearing forces between the core particles and the peripheral particles. Hence the present method enables the attachment of larger peripheral particles (with sizes amounting up to the sizes of the core particles) than the techniques previously discussed. Furthermore, as will be apparent to those skilled in the art, possible differences in density between the core particles and the peripheral particles do not affect the applicability of the present method. Last but not least, the method according to the first aspect of the invention is also far less sensitive to the shape of the particles than the conventional methods discussed hereinbefore.

Preferably, the coating of the core particles with the adhesive is effected by spraying the adhesive onto the core particles while they are being dropped onto the powder comprising abrasive particles, i.e. while they are falling. This has the advantages that the individual core particles can be coated from adhesive from all sides and that the core particles are brought into contact with the peripheral particles almost immediately after the adhesive has been applied. Since the core particles are separately dropped, one also ensures that the core particles do not agglomerate, i.e. that each aggregate particle contains a single core particle in its centre.

The consolidation of the aggregate particles is preferably effected by heating the aggregate particles (e.g. in an oven or under IR light), which causes the solvent to evaporate and thereby the adhesive to set. As already mentioned above, the aggregate particles are preferably heated together with any non-attached particles of the powder.

Most preferably, the method comprises the step of recovering the consolidated aggregate particles from the non-attached peripheral particles. A convenient way to recover the consolidated aggregate particles from the non-attached abrasive particles is sieving. However, other separation methods can also be used if the materials used are compatible with them.

Those skilled will appreciate that various kinds of abrasive particles may be used as core particles, e.g. superabrasive particles such as natural or synthetic diamonds, CVD-coated diamonds, polycrystalline diamonds, boron nitride particles, etc. or "normal" abrasive particles such as tungsten carbide (WC) particles, tungsten (W) particles, sintered tungsten carbide/cobalt (WC—Co) particles, cast tungsten carbide particles, etc. or abrasive particles comprising any combination of such materials. The core particles can also be aggregate particles, e.g. superabrasives surrounded with a coating of sinterable or encrusted within a coating of or presintered material, such as those disclosed in WO 2008/025838 A1 or WO 2008/025836 A1. Using abrasive particles having a coating comprising sinterable or presintered material as the core particles has the advantage that the innermost abrasive particles do not come into direct contact with the peripheral particles.

The kinds of particles usable for the core particles may also be used for the peripheral particles, where the core particles and the peripheral particles may be of the same or different kind. If the peripheral particles comprise each an abrasive particle, which for the intended application should not be in contact with one another, one may use aggregate particles as the peripheral particles. The coating of such peripheral particle then prevents that their abrasive cores get into contact with one another.

The adhesive used in the present method may comprise, for instance, a cellulose ether (e.g. methycellulose or ethylcellulose) as binding agent and a compatible solvent (e.g. an alcohol, an acetale, glycerol formal, tetraoxaundecane). Those skilled will be aware of other adhesives suitable for the method of the first aspect of the present invention. Preferably, the adhesive is chosen such that its components may vanish during a subsequent sintering treatment without leaving any organic residue behind in the final tool.

Preferably, the recovered aggregate particles are surrounded with a sinterable particulate mass, e.g. comprising particles of sinterable material (such as e.g. particles of WC, $W_2C$, brass, bronze, Ni, Fe, Co, Cu, CuMn, CuTi, or mixtures of these materials), binding agent and solvent for the binding agent. The binding agent and the solvent may be the same as for the adhesive but can also be chosen different. Such aggregate particles surrounded with sinterable particulate mass may be sintered in a further (optional) step of the method. This way, a presintered crust is obtained, which acts as a protective layer (facilitating storage and transport) and which prevents direct contact between the peripheral abrasive particles of neighbouring aggregate particles when the tool is moulded. The presintered crust also avoids direct contact between the abrasive particles and the mould or the walls of an extrusion/injection moulding system. Such presintered particles may also be used for forming a soft, easily deformable paste of the kind descrilayer in WO 2008/025838 A1, by mixing together the presintered aggregate particles, binding agent, solvent and sinterable matrix material in appropriate proportions.

According to a preferred embodiment of the first aspect of the present invention, the core particles as well as the peripheral particles are diamond particles (natural or synthetic ones, possibly CVD-coated, mono- or polycrystalline) and the consolidated aggregate particles are subjected, after separation from the non-attached particles, to a high pressure and high temperature (HPHT) treatment so as to create diamond-diamond bonds between the core particles and the peripheral particles. A conventional HPHT process for the production of synthetic diamonds, which may be adapted to the present invention is disclosed in U.S. Pat. No. 2,947,608 or, for the manufacture of polycrystalline diamond tablets, in US 2005/0019114 A1. Typically, in such an HPHT process, the pressure ranges from 5 to 10 GPa and the temperature from 1200 to 2000° C. Preferably, prior to the HPHT treatment, the recovered aggregate particles are surrounded with a particulate mass comprising catalyst particles for the formation of diamond-diamond bonds (e.g. Fe, Co, Ni or Ta particles; such catalysts are well known in the art and further examples can be found, for instance, in U.S. Pat. No. 2,947,608) and/or carbonaceous particles (such as e.g. graphite, coal, coke, charcoal, nanodiamonds etc.). It shall be noted that for certain applications, the particulate mass comprising catalyst particles may also be free or substantially free of carbonaceous material.

In principle, the core particles may have diameters up to a few millimeters (and this is not even a strict limitation). Preferably, the core particles range in size from 14 mesh to 60 mesh (always ASTM standard). The peripheral particles preferably range in size from 16 mesh to 400 mesh (more preferably from 25 mesh to 400 mesh). Advantageously, the peripheral particles are smaller in size than the core particles.

A second aspect of the present invention concerns an apparatus for carrying out the method described above. Such apparatus may comprise a first chute for separately dropping core particles coated with adhesive onto a layer of abrasive particles, one or more spraying nozzles suitably arranged for coating the core particles with adhesive as they drop from the first chute, a conveyor belt for carrying the layer of peripheral particles under the first chute so that the core particles may drop onto that layer, a second chute suitably arranged with respect to the first chute for covering the core particles dropped on the layer of peripheral particles with further peripheral particles, so that aggregate particles are, each of which comprises a core particle having peripheral particles attached to it, and a heating chamber through which said conveyor belt carries the aggregate particles for causing the adhesive to set.

A third aspect of the present invention concerns an aggregate particle comprising a core diamond having a size between 14 mesh and 60 mesh and a plurality of peripheral diamonds having a size between 25 mesh and 400 mesh, the ratio of the size of the peripheral diamonds to the size of the core diamond being comprised in the range from 1/2 to 1/31, more preferably in the range from 1/2 to 1/15, the peripheral diamonds surrounding the core diamond and being attached to the core diamond with diamond-diamond bonds. Most preferably, the peripheral diamonds arranged around a core diamond are of substantially uniform size. Such aggregate particles are hereinafter called "diamond aggregate particles" for better distinction from other aggregate particles discussed herein. Thanks to their "hedgehog-like" shape, diamond aggregate particles can be better anchored within a matrix of sintered material than normal diamonds of comparable size.

Accordingly, such diamond aggregate particles are especially well suited for use in abrading or cutting tools exposed to high friction forces (e.g. drill bits, inserts for drill bits, etc.)

In the context of this invention, when reference is made to particles, e.g. diamonds, of substantially uniform size, this is intended to mean that these particles belong to the same class according to FEPA standard. The "narrow" or "single" classes correspond to −14/+16 mesh, −16/+18 mesh, −18/+20 mesh, −20/+25 mesh, −25/+30 mesh, −30/+35 mesh, −35/+40 mesh, −40/+50 mesh, −50/+60 mesh, −60/+70 mesh, −70/+80 mesh, −80/+100 mesh, −100/+120 mesh, −120/+140 mesh, −140/+170 mesh, −170/+200 mesh, −200/+230 mesh, −230/+270 mesh, −270/+325 mesh and −325/+400 mesh. The "wide" or "double" classes correspond to −16/+20 mesh, −20/+30 mesh, −30/+40 mesh, −40/+50 mesh, etc. Preferably, the core diamonds belong to a single or double class and the peripheral diamonds to a single class.

Diamond aggregate particles according to the third aspect of the invention are preferably manufactured using the method disclosed herein: diamond particles (natural or synthetic ones, possibly CVD-coated, mono- or polycrystalline) with the sizes specified above are provided as the core and the peripheral particles. After consolidation of the aggregate particles, these are surrounded with a particulate mass comprising carbonaceous particles (e.g. particles of graphite, coal, coke, charcoal, nanodiamonds etc.), and optionally also catalyst particles for the formation of diamond-diamond bonds (e.g. Fe, Co, Ni or Ta particles). The so prepared aggregate particles are then subjected to an HPHT diamond synthesis process so as to create diamond-diamond bonds between the core particles and the peripheral particles. Most preferably, the carbonaceous particles comprise nanodiamonds (e.g. of detonation origin), having sizes smaller than 100 nm, preferably smaller than 50 nm and still more preferably smaller than 10 nm Nevertheless, as those skilled will appreciate, the diamond aggregate particles according to the third aspect of the invention could also be produced using another method (e.g. by manually gluing the peripheral diamonds on the core diamond and subjecting the so-obtained raw aggregate particle to an HPHT diamond synthesis process with addition of carbonaceous material).

Preferably, the core diamond and the peripheral diamonds are monocrystalline diamonds. The diamond aggregate particle according to the third aspect of the invention may be part of a diamond network, i.e. diamonds attached to one another with diamond-diamond bonds. Such diamond network could be a polycrystalline diamond (PCD) compact, e.g. a PCD tablet of a PCD cutter. To produce such a PCD compact, diamond particles (natural or synthetic ones, possibly CVD-coated, mono- or polycrystalline) are provided as the core and the peripheral particles and preferably subjected to a method for producing consolidated particles as disclosed hereinbefore as the first aspect of the invention. After consolidation of the aggregate particles, these are surrounded with a particulate mass comprising carbonaceous particles (e.g. particles of graphite, coal, coke, charcoal, nanodiamonds etc.), and optionally also catalyst particles for the formation of diamond-diamond bonds (e.g. Fe, Co, Ni or Ta particles). The so prepared aggregate particles are confined in a container of a diamond press and subjected to an HPHT diamond synthesis process so as to create diamond-diamond bonds between the core particles, the peripheral particles and the surrounding carbonaceous material, whereby the diamond network is formed. Most preferably, the carbonaceous particles comprise nanodiamonds (e.g. of detonation origin), having sizes smaller than 100 nm, preferably smaller than 50 nm and still more preferably smaller than 10 nm.

A PCD cutter typically comprises a PCD compact bonded to a substrate material, which is typically a sintered metal-carbide to form a generally cylindrical cutting structure. According to a conventional technique for forming a PDC, a cemented carbide substrate (e.g. made of tungsten carbide) is placed into the container of a press. A mixture of diamond grains or diamond grains and catalyst binder (e.g. Fe, Co, Ni or Ta particles) is placed atop the substrate and subjected to HPHT conditions to form diamond-diamond bonds. During the HPHT process, metal binder of the substrate migrates into the diamond region, whereby the diamond layer (the "diamond table") becomes bonded to the substrate. Due to the catalyst binder and the metal diffusing from the substrate, PCD compacts produced according to this conventional method often comprise a substantial amount of metal (often Co) within the matrix of diamond grains bonded together. PCD cutters are commonly used as abrasive inserts on drill bits, where they are typically exposed to high temperatures due to friction of the diamond table on the rock formation. Due to the significant difference in the coefficients of thermal expansion of the catalyst binder and diamond, the catalyst binder enclosed in the diamond matrix expands at a higher rate than the diamond, which may cause cracks in the diamond structure and result in deterioration of the PCD tablet. In the past, this problem has been partially overcome by leaching the catalyst binder from the diamond structure after the HPHT process using strong acids, typically nitric acid or combinations of several strong acids (such as nitric and hydrofluoric acid).

Another way to reduce that problem is to replace the catalyst metal particles by nanodiamonds (e.g. of detonation origin). Thus the diamond network with diamond aggregate particles according to the third aspect of the present invention is preferably free or essentially free of catalyst metal. Preferably, a PCD cutter comprises a PCD compact bonded to a substrate material, e.g. a sintered metal-carbide, to form a generally cylindrical cutting structure, the PCD compact comprising a diamond network with diamond aggregate particles according to the third aspect of the present invention. To produce such a PCD cutter, the substrate (e.g. made of tungsten carbide) is placed into the container of a press and a mixture of consolidated aggregate particles (diamond core particles surrounded by peripheral diamonds), preferably produced according to the method of the first aspect of the invention, and carbonaceous material including nanodiamonds is placed atop the substrate and subjected to HPHT conditions to form diamond-diamond bonds. It should be noted that during the fabrication of such PCD cutter, the bonding of the PCT compact to the substrate is assured by metal binder migrating from the substrate into the diamond network. However, unlike in conventional PCD cutters, the metal inclusions are confined to a region close to the substrate. Most preferably, the substrate also has diamond aggregate particles dispersed therein.

The applicant explicitly reserves the right to claim patent protection for the diamond aggregate particles according to the third aspect of the invention and/or a diamond network being built from such aggregate particles independently from any particular method for their production, be it in a possible divisional, continuation or continuation-in-part patent application based upon the present application.

BRIEF DESCRIPTION OF THE DRAWINGS

Further details and advantages of the different aspects of present invention will be apparent from the following detailed description of several not limiting embodiments with reference to the attached drawings, wherein.

DETAILED DESCRIPTION

Figure 1:
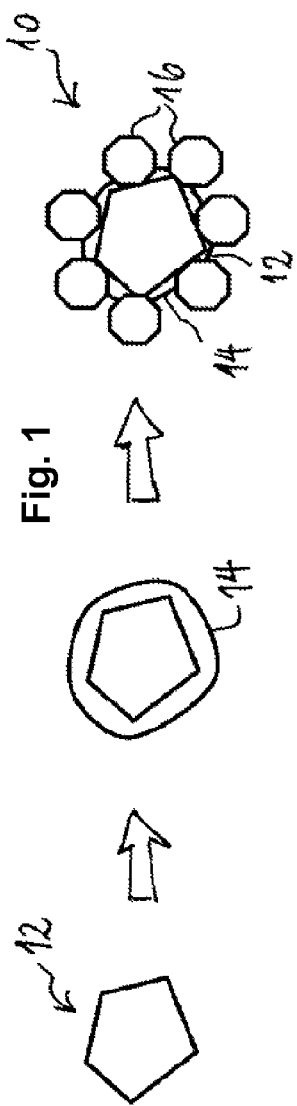
FIG. 1 is a schematic illustrating the formation of a first type of aggregate abrasive grains.
Figure 2:
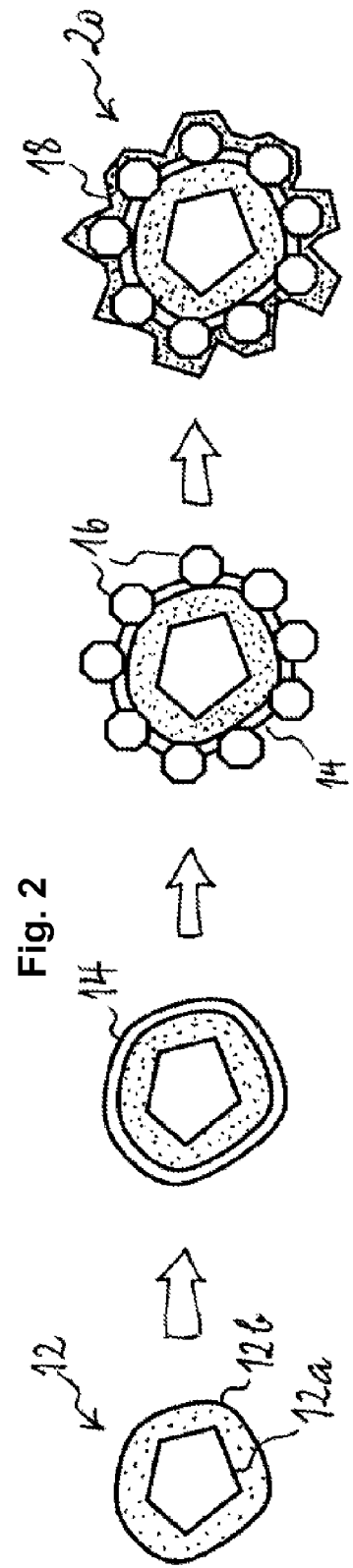
FIG. 2 is a schematic illustrating the formation of a second type of aggregate abrasive grains.
Figure 3:
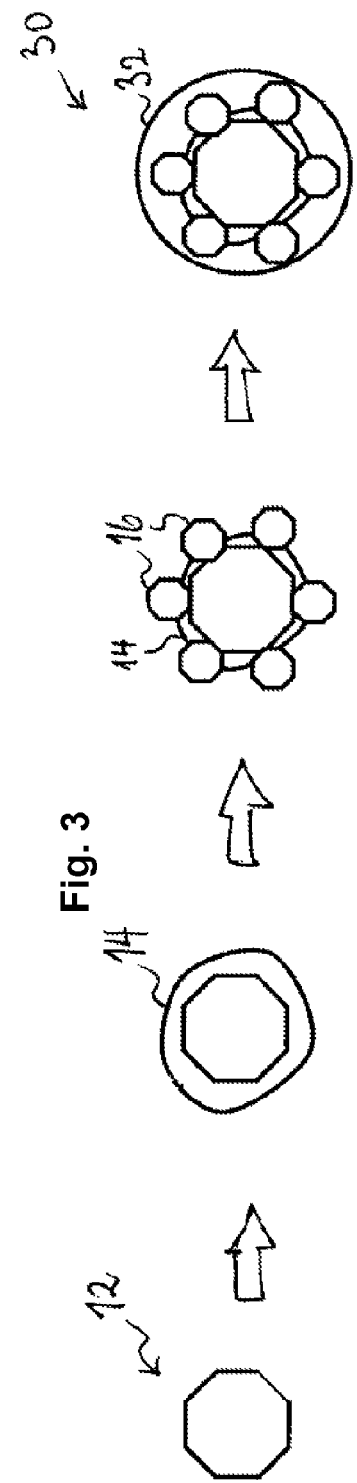
FIG. 3 is a schematic illustrating the formation of a third type of aggregate abrasive grains.

FIGS. 1-3 illustrate the formation of aggregate abrasive grains 10, 20, 30 according to the method of the first aspect of the invention. First, core particles 12 are provided. These core particles 12 are preferably superabrasive particles, such as natural or synthetic diamonds, CVD-coated diamonds, polycrystalline diamonds, boron nitride particles. Alternatively, abrasive particles such as tungsten carbide (WC) particles, tungsten (W) particles, sintered tungsten carbide/cobalt (WC—Co) particles, cast tungsten carbide particles, and like particles may be selected. FIG. 2 shows a core particle 12 comprising a superabrasive particle 12a encrusted within a coating 12b of presintered material. For the production of such particles, reference is made to WO 2008/025836 A1 and WO 2008/025838 A1. The core particles 12 (including their possible coatings) are preferably of substantially uniform size between 14 mesh and 60 mesh, e.g. −20/+30 mesh, −20/+25 mesh, −25/+35 mesh, −30/+40 mesh, −40/+50 mesh, etc).

In the next step, the particles 12 intended to become the core particles of the aggregate grains are coated with liquid adhesive 14 (obtained e.g. from mixing ethylcellulose, methylcellulose or polyvinyl butyral with an appropriate solvent, e.g. alcohol, acetale, 2,5,7,10-tetraoxaundecane, glycerol formal, acetone etc.). The composition of the adhesive 14 is chosen such that after evaporation of the solvent, enough binding agent is left that keeps the particles together.

Then, the adhesive-coated core particles are surrounded with peripheral abrasive particles 16. To this end, the adhesive-coated core particles are dropped into a layer of abrasive particles intended to become the peripheral particles and further such particles are spread over the adhesive-coated core particles. After the peripheral particles have been brought into contact with the adhesive coating 14, the raw aggregate particles are handled carefully so as to avoid, as much as possible, any relative movements between the core particles 12 and the peripheral particles 16. As peripheral particles 16, one may choose the same kind of particles as for the core particles 12 or a different kind. Possible combinations are, for instance diamond particles as core particles and smaller diamond particles, cast tungsten carbide particles or fused tungsten carbide particles as peripheral particles. Preferably, the peripheral particles 16 are of substantially uniform size between 60 mesh and 400 mesh, e.g. −60/+80 mesh, −80/+120 mesh, −100/+170 mesh, −120/+200 mesh, −140/+230 mesh −170/+325 mesh, −230/+400 mesh, −325/+400 mesh, etc. To surround the core particles with peripheral particles as uniformly as possible, the peripheral particles should have an inferior diameter compared to the diameter of the core particles.

The next step comprises (a) the consolidation of the raw aggregate particles by making the solvent of the adhesive evaporate and (b) the separation of the consolidated aggregate particles from the unused particles (i.e. those particles that have not been attached to the core particles), preferably by using a sieve. The spiky consolidated aggregate particles 10 can be used as such for the production of abrading or cutting tools e.g. by mixing them into a sinterable material or paste. This may be done, in particular, if the peripheral particles are of sinterable material, e.g. cobalt, nickel or bronze, which strongly bonds to the surrounding matrix material.

Preferably, however, the aggregate particles are coated with a sinterable particulate mass and presintered so that one obtains grains with relatively hard crust 18, as shown in FIG. 2. For the application of the sinterable particulate mass, reference is made again to WO 2008/025836 A1 and WO 2008/025838 A1. The thickness of the outer crust is preferably chosen such that the spikiness of the aggregate particles is preserved. The outer crust 18 (and possibly the inner crust 12b if one was present) preferably contains particles which chemically bonds to the core particles 12 and/or the peripheral particles 16 (e.g. CuMn and CuTi in case of diamond particles).

FIG. 3 illustrates a particularly preferred embodiment of the invention. In this embodiment, diamond particles (natural or synthetic ones, possibly CVD-coated, mono- or polycrystalline) are provided as the core and the peripheral particles. After consolidation of the aggregate particles, these are surrounded with a particulate mass 32 comprising carbonaceous particles (e.g. particles of graphite, coal, coke, charcoal, etc.), and possibly also catalyst particles for the formation of diamond-diamond bonds (e.g. Fe, Co, Ni or Ta particles). The so prepared aggregate particles 30 are then subjected to an HPHT treatment so as to create diamond-diamond bonds between the core particles and the peripheral particles. Most preferably, the carbonaceous particles comprise nanodiamonds (e.g. of detonation origin), having sizes smaller than 100 nm, preferably smaller than 50 nm and still more preferably smaller than 10 nm.

Figure 4:
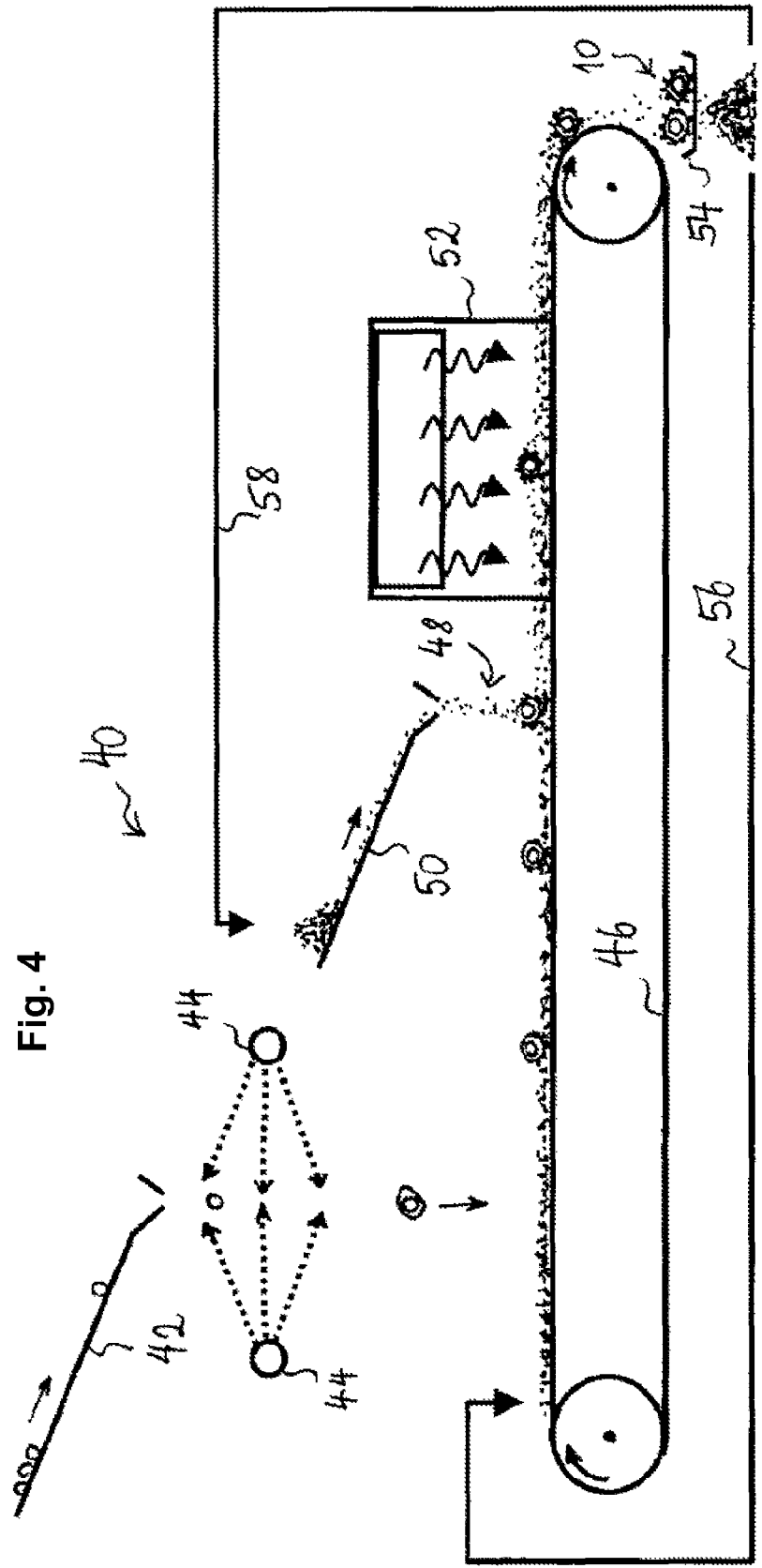
FIG. 4 is a schematic illustration of an apparatus for carrying out the method of forming aggregate abrasive grains.

FIG. 4 shows a schematic view of an apparatus 40 for carrying out the method of forming aggregate abrasive grains 10 (whose size is totally exaggerated in FIG. 4 for clarity of the drawing). The core particles are provided via a first chute 42 having at its lower end openings letting the core particles pass only separately from one another. While they are in free fall from the chute 42, the individual core particles are spray-coated with liquid adhesive provided through spray nozzles 44. The core particles are dropped separately onto a layer of peripheral particles. The layer of peripheral particles is gently moved forward on a on a conveyor belt 46, which carries the dropped adhesive coated core particles through a curtain 48 of further peripheral particles falling from a second chute 50, which ensures that peripheral particles are distributed about the whole outer surface of the core particle. The conveyor belt 46 then carries the particles through a heating chamber 52, where the solvent of the adhesive is caused to evaporate and where the aggregate particles are consolidated. The heating may e.g. be effected by resistance-heating, IR light and/or hot air. The temperature of the heating chamber 52 is chosen high enough to allow efficient evaporation of the solvent during the residence time of the particles in the chamber 52 but also low enough not to cause the binding agent to disintegrate. The consolidated aggregate particles are then separated from the remaining particles using a sieve 54. As indicated by arrows 56 and 58, particles that have not been attached to the core particles are fed back to the beginning of the conveyor belt 46 and the second chute 50 that provides the curtain 48 of peripheral particles.

Figure 5:
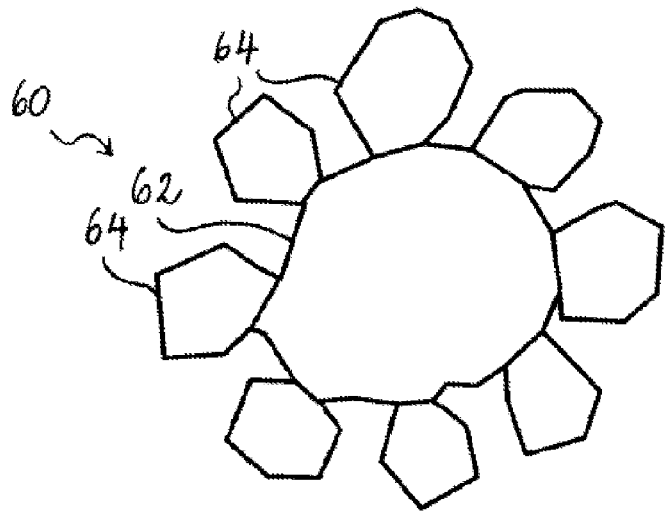
FIG. 5 is a schematic illustration of a diamond aggregate particle according to the third aspect of the invention.

FIG. 5 is an illustration of a diamond aggregate particle 60 according to the third aspect of the invention. The diamond aggregate particle 60 comprises a core diamond 62 having a size between 14 mesh and 60 mesh and a plurality of peripheral diamonds 64 having a size between 50 mesh and 400 mesh.

Figure 6:
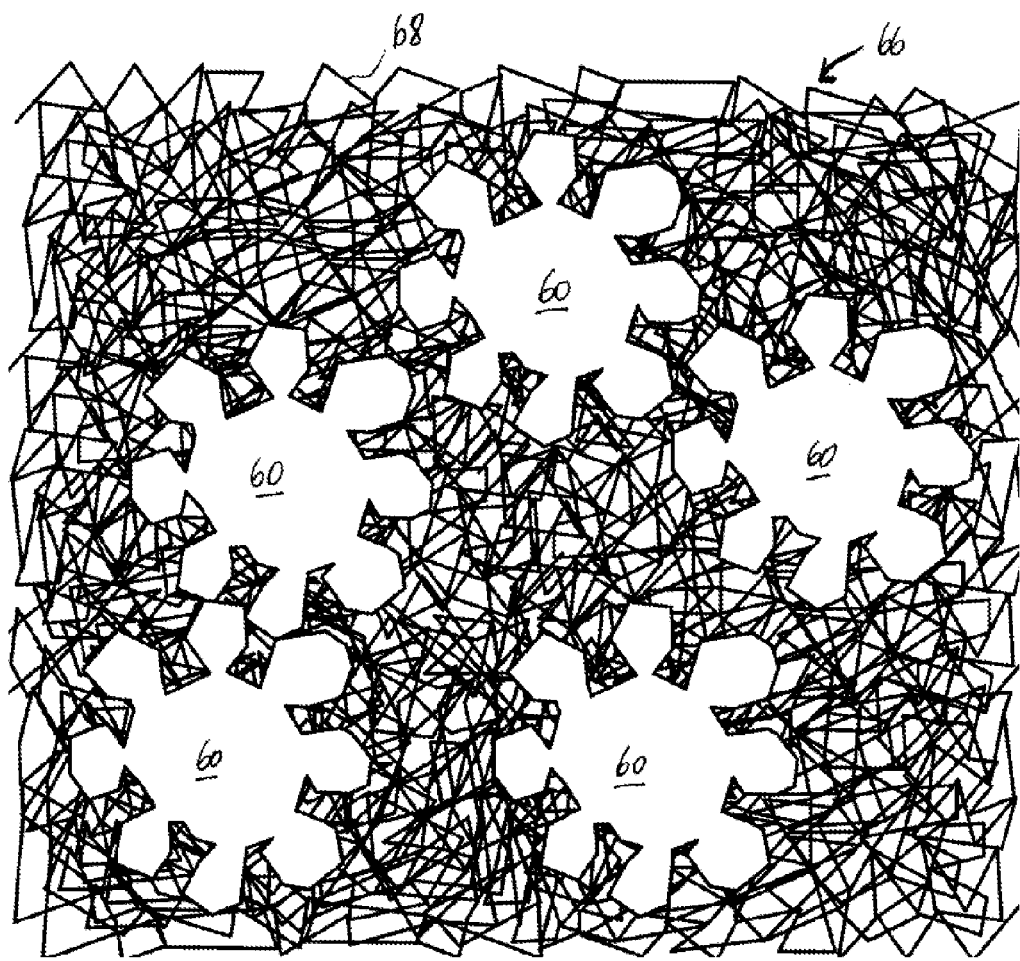
FIG. 6 is a schematic illustration of a diamond network comprising diamond aggregate particles.

FIG. 6 is an illustration of a diamond network 66 having diamond aggregate particles 60 embedded in a polycrystalline diamond matrix 68.

Figure 7:
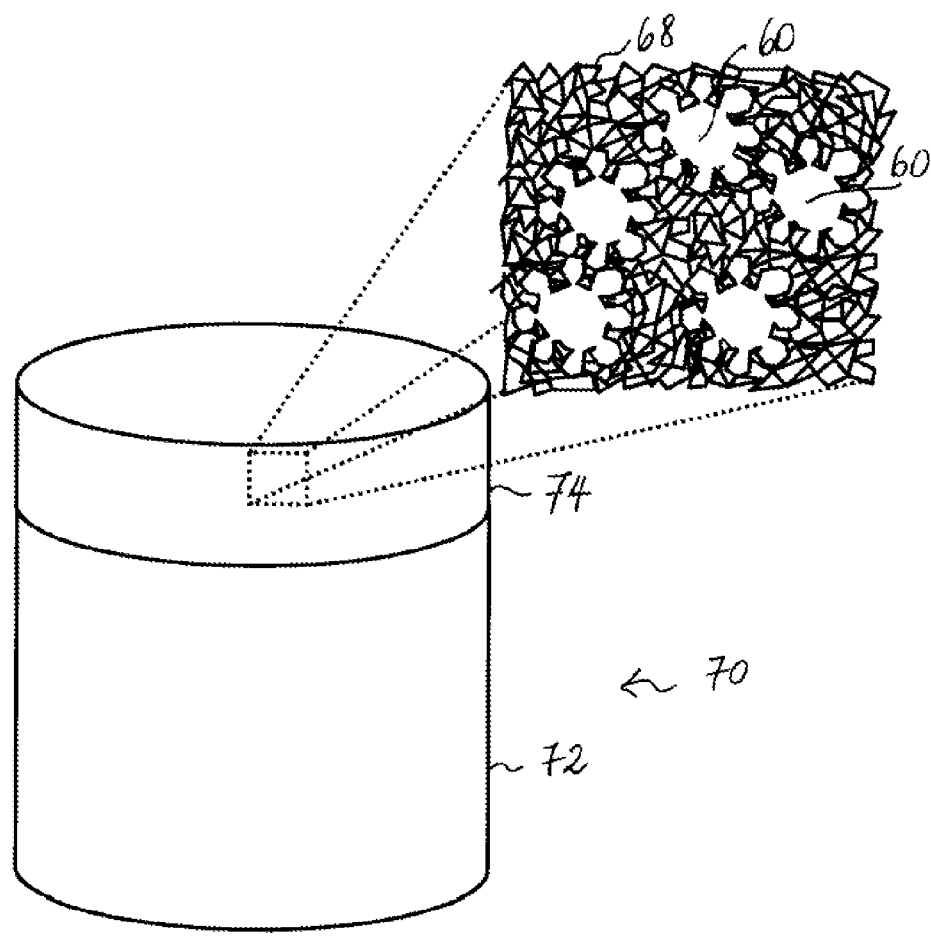
FIG. 7 is a schematic illustration of an insert for a drill bit comprising a diamond network as shown in FIG. 6 as the PCD compact.

FIG. 7 is an illustration of a insert 70 (a PCD cutter for a drill bit) comprising a base 72 made of sintered metal carbide (e.g. WC, $W_2C$, cast tungsten carbide, mixtures thereof, etc.) and metal binder (bronze, Co, Cu, mixtures of such metals, etc.) and a PCD compact 74. As shown by the enlargement, the PCD compact includes a diamond network 68. (Due to the "hedgehog-like" shape of the diamond aggregate particles 60,) it is possible to anchor much larger diamonds in the PCD matrix than it was possible before the present invention. Furthermore, with the diamond aggregate particles, it is possible to achieve a better distribution of coarse particles within the diamond tablet. As will be appreciated, the rough working surface of the tablet due to the presence of coarse particles improves the rate of penetration (ROP) with respect to conventional tablets. Another advantage of a PCD tablet comprising the diamond aggregate particles is better control of fractures in the diamond tablet when cutting very hard stone/material, such as hard quartzite. PCD tablets with diamond aggregate particles are well suited for operating in different cutting modes: "chipping" in soft soils and "abrasion" in hard soils. This is particularly advantageous when drilling into interbedded formations.

Example 1

Aggregate abrasive grains were formed according to the method described above using diamond particles (MBS 960, −20/+25 mesh) as core particles and cast tungsten carbide particles with diameters from 75 to 150 μm as peripheral particles. The diamonds were spray-coated with an adhesive composed of polyvinyl butyral dissolved in methanol. The adhesive was obtained by using 425 ml of methanol per 100 g of polyvinyl butyral. After the diamonds had been dropped into a layer of cast tungsten carbide particles and covered with further such particles, they were dried during 20 minutes at 60° C. The consolidated aggregate particles were then separated from the excess tungsten carbide particles by sieving.

Example 2

In this example, SDB 1100, −30/+40 mesh diamonds were used as core particles and SDB 1100, −50/+60 mesh diamonds as peripheral particles. The core particles were spray-coated with an adhesive composed of polyvinyl butyral dissolved in methanol. The adhesive was obtained by using 1100 ml of methanol per 57 g of polyvinyl butyral. The aggregate particles were consolidated in during 20 minutes at 60° C. and separated from the excess −50/+60 mesh diamonds.

The consolidated aggregate particles were thereafter fed into a rotary mixing container, where the amount of aggregate particles and the rotational speed of the mixing container were chosen such that the aggregate particles rolled on themselves under the action of gravity. A mixture of a powder of carbonaceous material and a binding agent was then progressively sifted onto the aggregate particles, while a fine spray of solvent for the latter binding agent was directed thereto using a spray nozzle. The powder of carbonaceous material included in this example of 40 wt % of purified flake graphite and 60 wt % of carbonyl iron powder (CN type, from BASF). Methylcellulose (Methocel™ A4M from Dow Chemical) was used as binding agent in the amount of 0.2 wt % with respect to the powder of carbonaceous material. Glycerol formal was used as the solvent for the binding agent. The rates at which the mixture and the solvent were introduced into the mixing container was chosen such that the mixture adhered on the aggregate particles substantially without formation of waste granules, i.e. such granules which do not contain an aggregate particle. At reference numeral 30, FIG. 3 shows schematically the appearance of aggregate abrasive grains with a coating of carbonaceous material.

The so-obtained malleable granules were dried under nitrogen/hydrogen atmosphere in a furnace at 200° C. during 45 minutes.

The dried granules may be used for the production of polycrystalline diamond (PCD) elements, e.g. PCD tablets. To this end, the dried granules may be compacted into the desired shape and subjected to a HPHT treatment leading to the formation of diamond-diamond bonds between existing diamond and to the synthesis of new diamond domains from the carbonaceous material.

The following table allows converting the ASTM mesh sizes into approximate particle diameters:

| Mesh size | Diameter (μm) |
| --- | --- |
| 14 | 1400 |
| 16 | 1180 |
| 18 | 1000 |
| 20 | 850 |
| 25 | 710 |
| 30 | 600 |
| 25 | 500 |
| 40 | 425 |
| 45 | 355 |
| 50 | 300 |
| 60 | 250 |
| 70 | 212 |
| 80 | 180 |
| 100 | 150 |
| 120 | 125 |
| 140 | 106 |
| 170 | 90 |
| 200 | 75 |
| 230 | 63 |
| 270 | 53 |
| 325 | 45 |
| 400 | 38 |

The invention claimed is:

1. A method of forming aggregate abrasive grains for use in the production of abrading or cutting tools, each of said aggregate abrasive grains comprising an abrasive core particle and several abrasive peripheral particles disposed around the core particle, wherein said method comprises:
coating said core particles with adhesive, said adhesive comprising a binding agent and a solvent for the binding agent;
separately dropping said core particles coated with adhesive onto a layer of said peripheral particles and covering the dropped core particles with further peripheral particles, in such a way as to form aggregate particles, each of which comprises a core particle having peripheral particles attached to it;
consolidating said aggregate particles by causing said solvent to evaporate.

2. The method according to claim 1, comprising recovering the consolidated aggregate particles from non-attached peripheral particles.

3. The method according to claim 1, wherein the coating of said core particles with said adhesive is effected by spraying said adhesive onto said core particles while they are falling towards the layer of said peripheral particles.

4. The method according to claim 1, wherein said solvent is caused to evaporate by heating said aggregate particles.

5. The method according to claim 2, comprising surrounding the recovered aggregate particles with a sinterable particulate mass.

6. The method according to claim 5, comprising sintering the surrounded aggregate particles.

7. The method according to any one of claims 1, wherein at least one of said core particles and said abrasive peripheral particles comprise tungsten carbide particles.

8. The method according to claim 1, wherein said core particles are superabrasive particles.

9. The method according to any one of claims 1, wherein each of said core particles comprises a superabrasive particle that is individually encrusted within a coating of presintered material or individually coated with a sinterable particulate mass.

10. The method according to claim 1, wherein said core particles are diamond particles.

11. The method according to claim 1, wherein said peripheral particles are diamond particles.

12. The method according to claim 10, further comprising recovering the consolidated aggregate particles from non-attached peripheral particles, wherein said peripheral particles are diamond particles, and wherein said method comprises surrounding said recovered aggregate particles with a particulate mass comprising carbonaceous particles.

13. The method according to claim 12, comprising subjecting said recovered aggregate particles to a high pressure and high temperature treatment so as to create diamond-diamond bonds between said core particles and said abrasive particles.

14. The method according to claim 12, wherein the particulate mass comprises catalyst particles for the formation of diamond-diamond bonds.

15. The method according to claim 10, further comprising recovering the consolidated aggregate particles from non-attached peripheral particles, wherein said peripheral particles are diamond particles, and wherein said method comprises surrounding said recovered aggregate particles with a particulate mass comprising catalyst particles for the formation of diamond-diamond bonds.

16. The method according to claim 15, comprising subjecting said recovered aggregate particles to a high pressure and high temperature treatment so as to create diamond-diamond bonds between said core particles and said abrasive peripheral particles.

17. The method according to claims 1, wherein said core particles range in size from 14 mesh to 60 mesh.

18. The method according to claim 1, wherein said peripheral particles range in size from 16 mesh to 400 mesh.

* * * * *